July 6, 1965  R. L. LARSON ETAL  3,193,713
INDUCTOR ALTERNATOR

Filed Oct. 6, 1960  4 Sheets-Sheet 1

INVENTORS
Robert L. Larson
BY Robert W. Campbell

C. R. Meland
Their Attorney

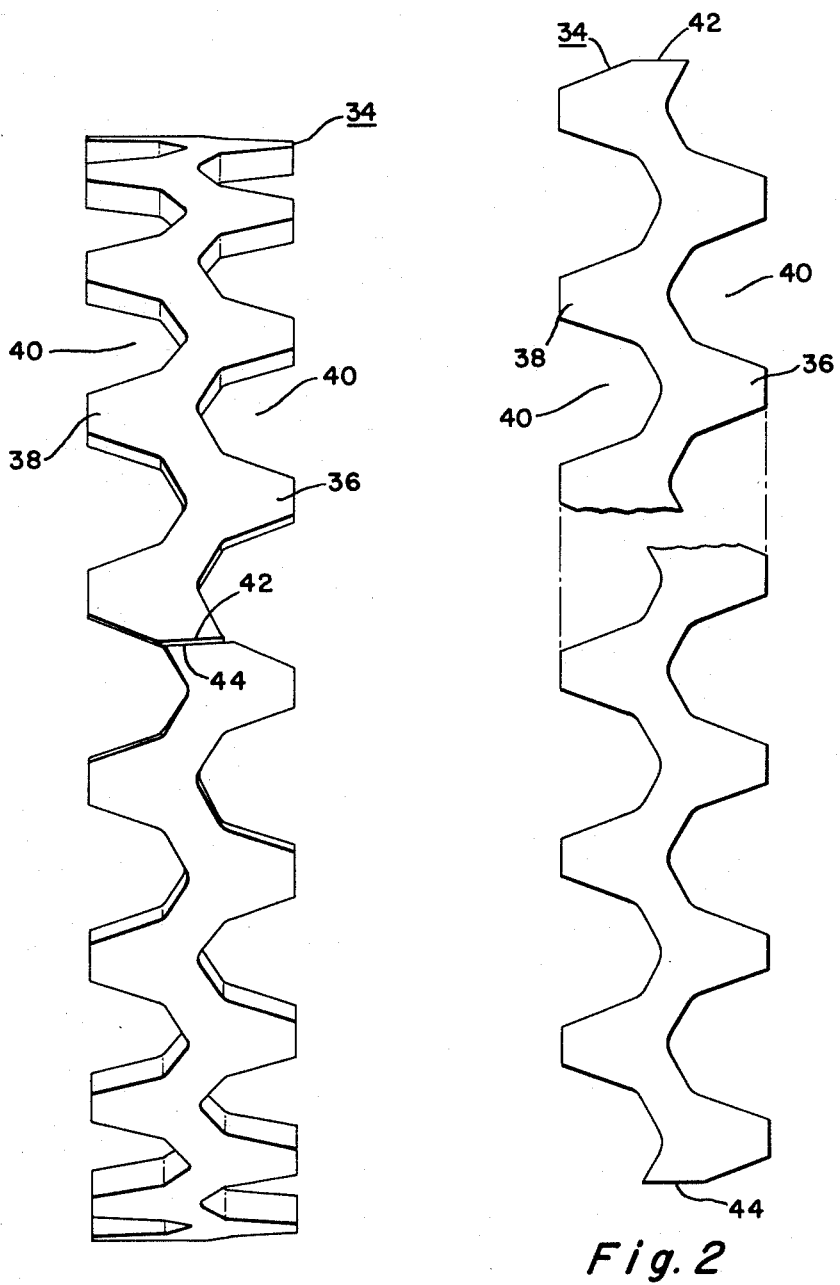

INVENTORS
Robert L. Larson
BY Robert W. Campbell

C.R. Meland
Their Attorney

INVENTORS
Robert L. Larson
Robert W. Campbell
BY
C. R. Meland
Their Attorney

United States Patent Office 3,193,713
Patented July 6, 1965

3,193,713
INDUCTOR ALTERNATOR
Robert L. Larson and Robert W. Campbell, Anderson, Ind., assignors to General Motors Corporation, Detroit, Mich., a corporation of Delaware
Filed Oct. 6, 1960, Ser. No. 60,825
5 Claims. (Cl. 310—168)

This invention relates to an improved A.C. generator of the inductor type and its method of manufacture wherein both the field and output windings of the alternator are fixed and wherein a solid rotatable rotor rotates around the output windings and causes a voltage to be induced in them.

The present invention relates to an improved alternator of the type shown in the patent to Schou, 2,071,953, that is, of the type wherein the rotor of the alternator forms a part of the flywheel of the engine or other power source that drives the alternator.

In contrast to the alternator shown in the above-mentioned Schou patent, it is an object of this invention to provide an alternator of the flywheel type wherein the rotor is made of a length of magnetic strip stock material formed into a circular shape and having alternate notches and wherein the rotor is supported by a flywheel member.

Another object of this invention is to provide an alternator of the flywheel type wherein the rotor is formed of a length of magnetic material that has alternate notched-out portions and a uniform thickness throughout its length whereby a minimum air gap is maintained between the inner surface of the rotor and the stator iron of the stator assembly.

A further object of this invention is to provide a method of manufacturing a rotor for a flywheel type of generator, the steps including, providing a straight length of magnetic material, cutting away selected portions of the material to form alternate notches therein, bending the notched length of material into a circular configuration and then fitting the length of material to a flywheel member.

Further objects and advantages of the present invention will be apparent from the following description, reference being had to the accompanying drawings wherein preferred embodiments of the present invention are clearly shown.

In the drawings:

FIGURE 2 is a plan view of the rotor of the alternator of this invention prior to it being bent into a circular configuration.

FIGURE 3 is a side view of the rotor of the alternator of this invention.

Figures 1, 4:
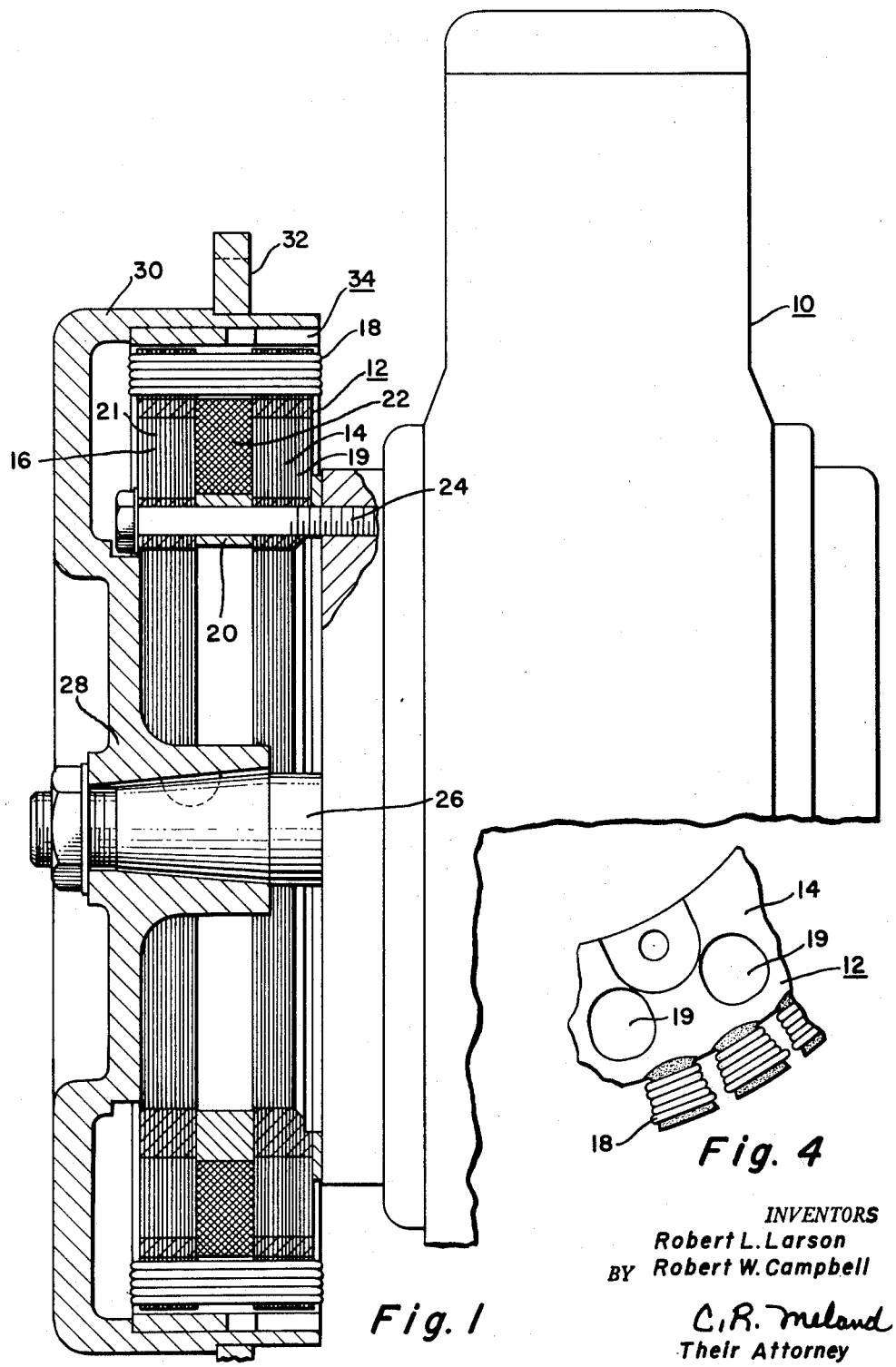
FIGURE 1 is a view partly in section illustrating the alternator of this invention connected with an engine.
FIGURE 4 is a view of a portion of the stator assembly of the alternator shown in FIGURE 1.

Referring now to the drawings and more particularly to FIGURE 1, the reference numeral 10 generally indicates a source of power which is used to drive the alternator of this invention. This power source could be an internal combustion engine and could be, for example, an outboard engine that is used to propel boats.

The alternator of this invention includes a stator assembly which is generally designated by reference numeral 12. This stator assembly comprises stacks of steel laminations 14 and 16 which have slots that receive a stator coil winding 18 and may also have openings as shown by numerals 19 and 21. The laminations forming the stacks 14 and 16 are welded together and it is seen that an iron core member 20 is provided which is positioned between and in contact with the lamination stacks 14 and 16. The core member 20 has wound thereon a fixed field winding 22. The stator winding 18 is formed with a plurality of coils as is well known to those skilled in the art and may be either a single phase winding or a polyphase winding. The field winding 22 may consist of one winding or where desired may be a dual winding. It can be seen that the stator assembly is fixed to the housing of the power source 10 by a plurality of bolts 24 which pass through the stacks of laminations 14 and 16 and through the iron core 20.

The reference numeral 26 in FIGURE 1 is used to designate a drive shaft of engine 10 and it is seen that this drive shaft carries and drives the flywheel 28 which is formed of steel or other metal material. The flywheel 28 has an annular section 30 as is clearly apparent from FIGURE 1. The annular section member 30 carries a ring gear 32 which is adapted to mesh with the pinion of a starter motor which is not illustrated.

The rotor of the alternator illustrated in FIGURE 1, which is a unique feature of this invention, is generally designated by reference numeral 34 and is shown in greater detail in FIGURES 2 and 3. The rotor 34 has a circular configuration and is formed from strip stock steel material. The rotor, as is best seen in FIGURES 2 and 3, has alternate projection portions 36 and 38 which are separated by the notched-out portions 40.

In forming the rotor member, 34, a length of strip stock material in a flat condition is provided. The flat strip stock material is then fed through a suitable punch press or the like to cut away selected portions of the material to thereby pierce the notches 40 to form the alternate projecting portions 36 and 38. When this has been accomplished, the strip stock material takes the configuration illustrated in FIGURE 2 where it is still in a flat or straight condition but wherein the notches and projecting portions have been formed. After the material is formed as shown in FIGURE 2, the material is cut to length and is then rolled or bent into a circular configuration. This is accomplished by any standard process familiar to those skilled in the art of metal forming. In performing this operation, a slight gap is maintained between the mating ends 42 and 44 as is clearly apparent from an inspection of FIGURE 3. This gap may be, for example, .025 inch where the diameter of the rotor is approximately 8.5 inches.

After the rotor has been formed as described, it may be shaped as by a process of coining to make it more perfectly round. It is then press-fitted to the inner surface of the annular section 30, the gap formed by the ends 42 and 44 of the length of magnetic material taking up any deviation in tolerances. The rotor member 34 is then welded to the annular section 30 and bored to be concentric with the hub portion of the flywheel. It is apparent that the rotor rotates with the flywheel and in close proximity to the ends or tips of lamination stacks 14 and 16.

In the operation of this alternator, when the power source 10 rotatably drives the rotor 34 and when the field winding 22 is provided with direct current, an A.C. voltage will be induced in the stator or output winding 18. The flux path is from one side of the field winding 22, thence, for example, upwardly through the stack of stator iron 14, thence into a rotor tooth 36, thence diagonally through the rotor member 34 to the tooth 38, thence downwardly through stator laminations 16 to the opposite side of the field winding 22. If a coil is selected on the stator winding, it will be apparent that as the rotor member 34 rotates, the direction of flux flow through this particular coil in the stator winding will reverse or flow in opposite directions as the rotor rotates. This will, of course, induce an A.C. voltage in the stator or output winding 18 which may be suitably rectified to supply direct current for charging batteries and supplying other D.C. leads on a boat or in other types of installations may be used without rectification.

In the embodiment of FIGURE 1, the housing of engine 10 may be formed of a non-magnetic material and the flywheel 28 formed of magnetic material. Where the engine housing is formed of magnetic material, the flywheel or at least a portion thereof, is preferably formed of non-magnetic material, although the flywheel can be designed to have long leakage paths so that both parts may be formed of magnetic material.

Figure 5:
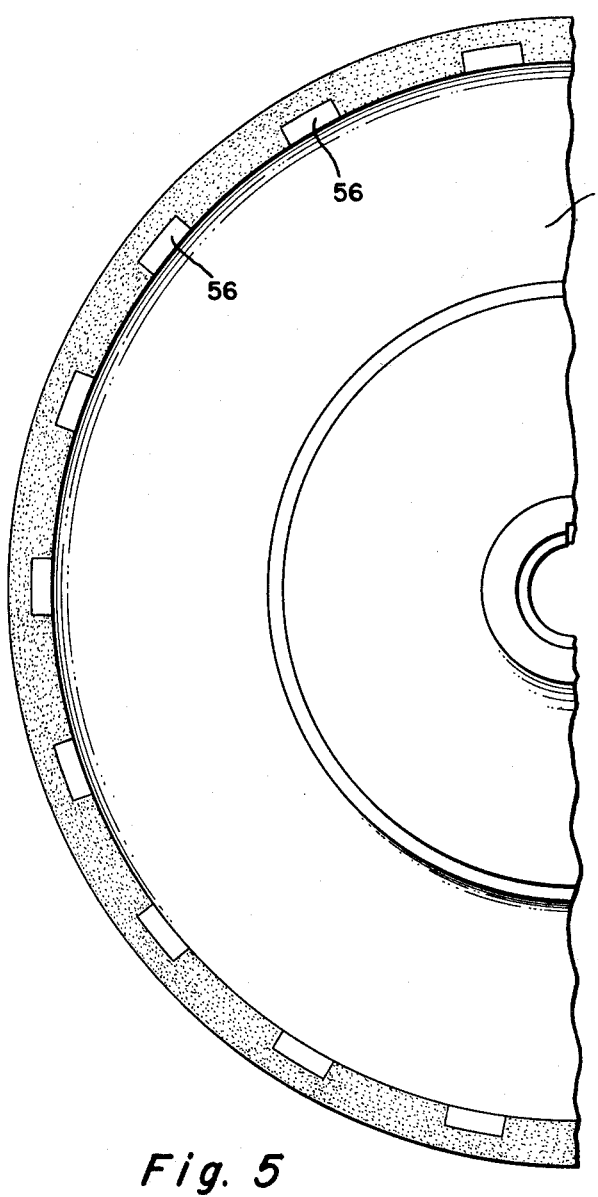
FIGURE 5 is an end view of a combined flywheel and rotor that may be used with the alternator of FIGURE 1.
Figure 6:
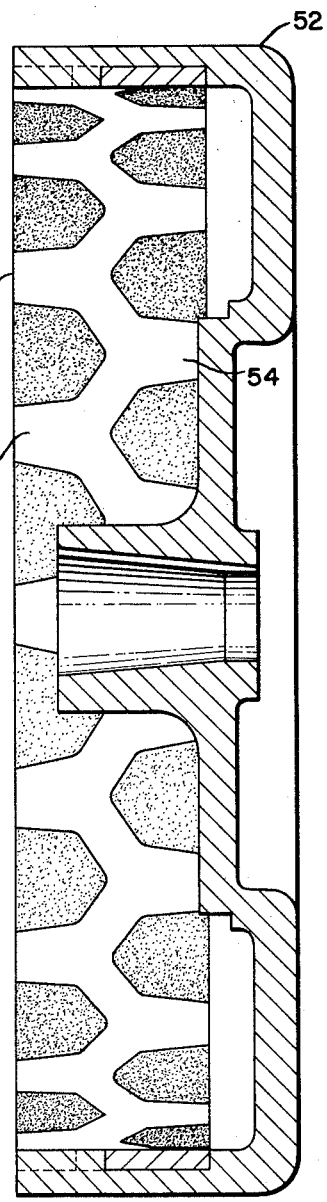
FIGURE 6 is a sectional view of the combined flywheel and rotor shown in FIGURE 5 taken along a diameter of the fly wheel and rotor that passes through two rotor segments.

Referring now to FIGURES 5 and 6, a modified flywheel construction is shown which may be used as a combined flywheel and rotor for the generator of FIGURE 1. The sectional view of FIGURE 6 is taken along a diameter of the rotor shown in FIGURE 5 that passes through two segments 56. This combined flywheel and rotor includes the steel rotor segment 50 which is die cast into the flywheel of nonmagnetic material 52. The steel rotor segment 50 has notches defining the oppositely extending teeth 54 and 56 and it is apparent that it is the same as the rotor 34 of FIGURE 1. The flywheel 52 is preferably made of aluminum.

Figures 7, 8:
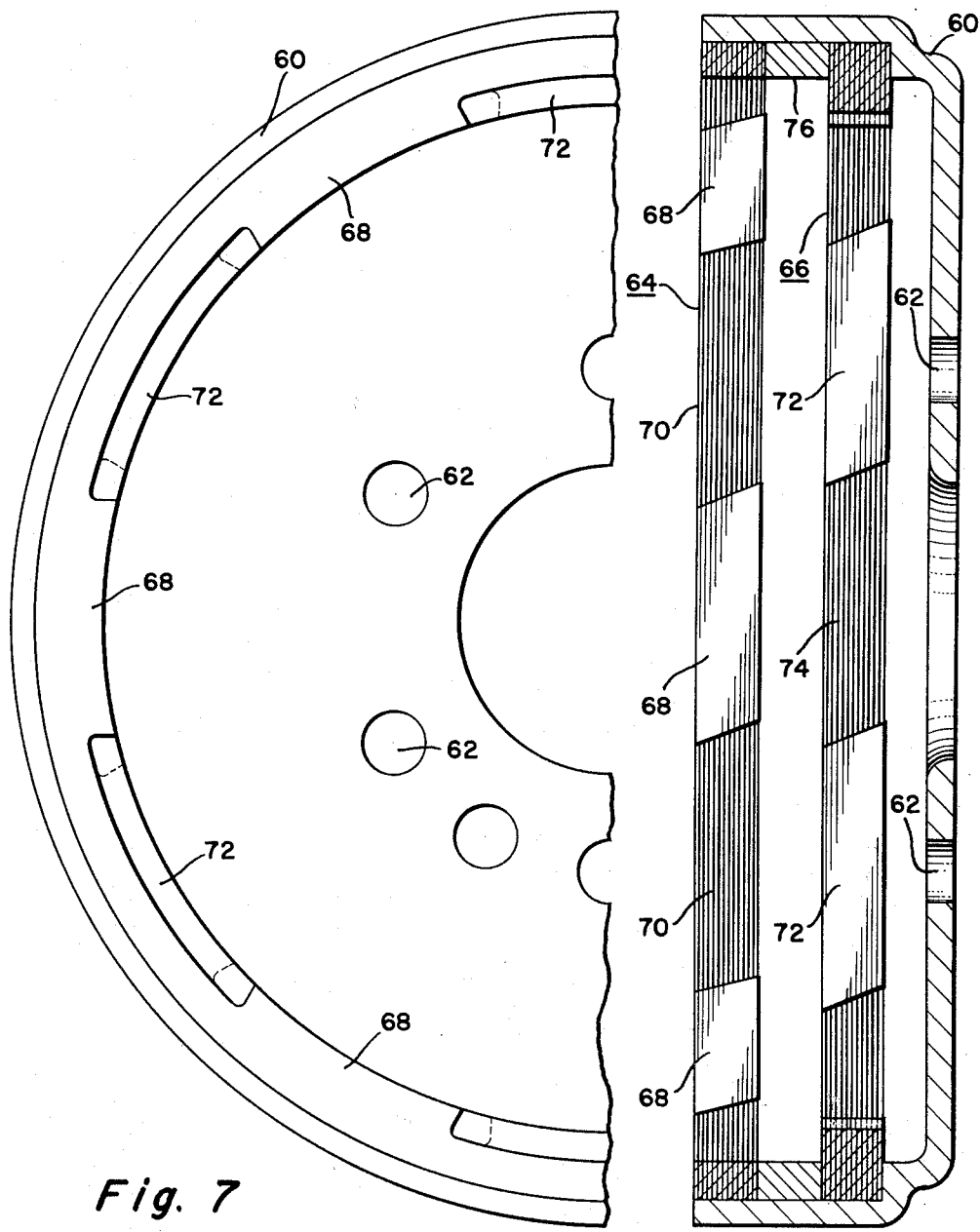
FIGURE 7 is an end view of another modified rotor that may be used with the alternator of FIGURE 1.
FIGURE 8 is a sectional view of the rotor shown in FIGURE 7 taken along a diameter of the rotor that passes through two rotor segments.

Referring now to FIGURES 7 and 8, another rotor is illustrated which may be used as the rotor for the alternator of FIGURE 1. The sectional view of FIGURE 8 is taken along a diameter of the rotor shown in FIGURE 7 which passes through segments 72. This rotor includes a generally cup-shaped spinner or flywheel member 60 which is formed of a metal material such as steel or aluminum. The spinner member 60 has bolt holes 62 that are adapted to receive bolts for mounting the rotor on a suitable hub member carried by an engine drive shaft. It is apparent that the spinner member 60 could be made like the flywheel 28 to fit the shaft 26 of the engine shown in FIGURE 1.

The spinner member 60 carries annular members 64 and 66. The member 64 has alternate teeth and notches 68 and 70 whereas the member 66 has alternate teeth and notches 72 and 74. The notches and teeth of each member are staggered so that the teeth 68 on member 64, for example, are positioned opposite the notches 74 in member 66. It can be seen that the teeth and notches have ends which are preferably at an angle to the longitudinal axis of the spinner or flywheel member 60. An annular member 76 of solid magnetic material is positioned between laminated members 66 and 64.

It is to be pointed out that the spinner member 60 may be formed of steel material and the laminated sections 66 and 64 welded thereto. Where the spinner member 60 is aluminum, the parts it carries are preferably shrink fitted thereto.

While the embodiments of the present invention as herein disclosed constitute preferred forms, it is to be understood that other forms might be adopted.

What is claimed is as follows:

1. An alternating current generator comprising, first and second stator cores formed of magnetic material having outer circumferentially spaced and longitudinally extending slots, a core member formed of magnetic material positioned between and in engagement with said stator cores, a field coil positioned between said stator cores and around said core member, a stator winding including coils of wire wound in the slots of both stator cores and across the space between said stator cores, said stator cores, stator winding, core member, and field coil forming a fixed assembly, and a one-piece rotor member formed of magnetic material rotatable around the outer periphery of both stator cores, said rotor member having marginally located alternate oppositely directed projections and spaces forming the sole means for completing a magnetic circuit between the outer peripheral faces of said two stator cores.

2. An alternating current generator comprising, first and second stator cores formed of magnetic material having outer circumferentially spaced and longitudinally extending slots, means spacing said core members axially from each other comprising a magnetic core member, a field winding wound on said core member, a stator winding including coils of wire wound in the slots of both stator cores and across the space between said stator cores, said stator cores, stator winding, core member and field coil forming a fixed assembly, and a cylindrical rotor member formed of magnetic material rotatably around the outer periphery of both stator cores, said rotor member having a substantially constant radial thickness throughout its length and having marginally located alternate oppositely directed projections and spaces, said rotor member forming the sole means for completing a magnetic circuit between the outer peripheral faces of said two stator cores.

3. An alternating current generator comprising, first and second stator cores formed of magnetic material having outer circumferentially spaced and longitudinally extending slots, a core member formed of magnetic material positioned between and in engagement with said stator cores, a field coil positioned between said stator cores and around said core member, a stator winding including coils of wire wound in the slots of both stator cores and across the space between said stator cores, said stator cores, stator winding, core member and field coil forming a fixed assembly, and an annular rotor member formed of magnetic material rotatable around the outer periphery of both stator cores, said rotor member having a radial thickness which is substantially constant and having marginally located alternate oppositely directed projections and spaces, said projections and spaces being positioned over the outer periphery of both stator cores.

4. An inductor alternator comprising, a fixed stator including first and second spaced stacks of stator laminations and an output winding formed of coils wound in slots formed in both of said first and second stacks of laminations, a fixed field assembly including a field core and a field winding positioned between said stacks of laminations, and a rotor member rotatable with respect to said stator assembly and positioned closely adjacent to the periphery of said first and second stacks of laminations, said rotor being formed of a unitary length of magnetic material whose radial thickness is substantially uniform throughout its length and having alternate marginally located notches defining oppositely directed projecting portions, said projecting portions being positioned over the periphery of said first and second stacks of laminations.

5. An inductor alternator comprising, a stator assembly including first and second spaced stacks of laminations and an output winding including coils wound in slots formed in both of said first and second stacks of laminations, a field assembly positioned between said stacks of laminations including a field core and a field winding, means fixing said stator assembly and said field assembly from rotation, and a rotor member rotatable around the outer periphery of said stator assembly and in close proximity to the periphery of said first and second stacks of laminations, said rotor comprising a unitary length of magnetic strip stock material having marginally located cutaway portions defining oppositely directed projecting portions that are alternately spaced along the length of the magnetic material.

References Cited by the Examiner

UNITED STATES PATENTS

| | | | |
|---|---|---|---|
| 1,757,393 | 5/30 | Schmid | 310—42 |
| 1,919,995 | 7/33 | Wry | 154—64.5 |
| 2,071,953 | 2/37 | Schou | 310—168 |
| 2,483,024 | 9/49 | Roters | 29—155.53 |
| 2,763,916 | 9/56 | Korshi | 29—155.53 |
| 2,870,356 | 1/59 | Gibson | 310—258 |
| 2,871,384 | 1/59 | Gabriel | 310—258 |
| 2,976,439 | 3/61 | Kiekhaefer | 310—153 |

FOREIGN PATENTS

| | | |
|---|---|---|
| 416,034 | 11/46 | Italy. |
| 705,559 | 3/54 | Great Britain. |
| 895,330 | 11/53 | Germany. |

MILTON O. HIRSHFIELD, *Primary Examiner.*

DAVID X. SLINEY, *Examiner.*